(12) United States Patent
Parry et al.

(10) Patent No.: US 7,043,166 B2
(45) Date of Patent: May 9, 2006

(54) METHODS AND SYSTEMS FOR PROVIDING FIRMWARE TO A PRINTING DEVICE

(75) Inventors: Travis J. Parry, Boise, ID (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

(21) Appl. No.: 10/615,033

(22) Filed: Jul. 8, 2003

(65) Prior Publication Data

US 2005/0008376 A1 Jan. 13, 2005

(51) Int. Cl.
*G03G 15/00* (2006.01)
(52) U.S. Cl. .......................... 399/12; 399/24
(58) Field of Classification Search .............. 399/11, 399/12, 24, 25, 31, 80, 90, 110, 119, 120, 399/77
See application file for complete search history.

(56) References Cited

U.S. PATENT DOCUMENTS

| | | | | |
|---|---|---|---|---|
| 5,930,553 A | * | 7/1999 | Hirst et al. | 399/8 |
| 6,094,548 A | * | 7/2000 | Gunning et al. | 399/75 |
| 6,447,094 B1 | | 9/2002 | Berg et al. | |
| 6,735,399 B1 | * | 5/2004 | Tabb et al. | 399/8 |
| 6,807,388 B1 | * | 10/2004 | Kojima et al. | 399/80 |
| 6,820,039 B1 | * | 11/2004 | Johnson et al. | 702/184 |

FOREIGN PATENT DOCUMENTS

| | | | | |
|---|---|---|---|---|
| EP | 1376344 A2 | * | 1/2004 | |
| GB | 2371523 A | * | 7/2002 | |
| JP | 2002062769 A | * | 2/2002 | |

* cited by examiner

*Primary Examiner*—Robert Beatty

(57) ABSTRACT

A method of providing firmware for a printing device includes attaching a memory module storing the firmware to a printing device consumable. The memory module contains the firmware being provided for the printing device and a firmware interface object that can be used to interface the printing device with the new firmware.

33 Claims, 5 Drawing Sheets

METHODS AND SYSTEMS FOR PROVIDING FIRMWARE TO A PRINTING DEVICE

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Spreadsheet software allows a user to manage large amounts of financial and other types of information. Database software similarly allows a user to manage various databases of information such as, client contact information, address and phone number information or "to do" items.

Frequently, it is desirable to generate a hardcopy of a document or data set that is produced or stored on a personal computer. A hardcopy may be desired, for example, for record keeping purposes or to share with another party. Consequently, a wide variety of printers and printing devices have been developed that can receive a print job from a host computer and produce a hardcopy of the document or data represented by that print job. In order to save space, particularly in home offices, many users employ a multi-function peripheral (MFP) with a host computer. A multi-function peripheral is a device that combines some form of printer with one or more of the following: a scanner, a copier, or a facsimile machine.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multi-function peripherals, and the like. A printer or printing device may produce images on a variety of print media that are in color or are monochromatic.

The term "print job" is defined as data that has been specifically formatted for submission to a particular printer from which the printer can generate a hardcopy representing an underlying data set from which the print job was created. Most personal computers include programming that will be referred to generally as a "printer driver." A printer driver is a piece of software or firmware that receives data or a document to be printed from an application running on the computer. The printer driver formats the data for use by a corresponding printer, i.e., creates a print job, and then transmits the print job to the printer. Using the print job, the printer can produce a hardcopy of the underlying data or document.

In order to produce hardcopy documents, a printer or printing device uses supplies of materials that are "consumed" as documents are printed. Such consumables include, for example, toner and print media. As used herein and in the appended claims, "toner" shall be broadly defined to include any material that is selectively distributed by a printer or printing device on a print medium to form an image. Thus, "toner" includes, but is not limited to, ink, toner, colorant, printing fluid, etc. "Print media" or a "print medium" shall be broadly defined as any medium on which a printer or printing device prints an image. For example, types of "print media" include, but are not limited to, paper, cardboard, card stock, transparencies, vinyl, etc.

As used herein and the appended claims, the term "consumable" shall be defined to mean any material consumed by a printing device to produce hardcopy documents. For example, a consumable may be toner and the disposable cartridge or container that contains the toner in the printing device. A consumable may also be a stack or supply of print media. In addition to toner and print media, a "consumable" may be any part or portion of a printer or printing device that is periodically replaced to allow the printer or printing device to continue producing printed hardcopy documents.

Printing devices have become increasingly complex in recent years adding new features and capabilities in addition to improved print quality. This increasing complexity is evident in both the hardware and computer-readable instructions (e.g., firmware or embedded software) of a printing device. Due to the complexity of modern printing devices, especially in the device firmware or embedded software, glitches or bugs are sometimes discovered only after a product has been released. Additionally, embedded software upgrades are often created after a product has been released to allow a printing device to operate more effectively or efficiently, or to use new or improved technologies. In order to fix a firmware bug or install a firmware upgrade, new or additional firmware is transmitted to the printing device. This new or additional firmware is often called a "patch" and may be transferred to the printing device by one of several conventional methods, e.g., floppy disc, compact disc, Internet download, etc.

While these methods of transferring firmware patches or upgrades to a printing device are commonly used, the process is often complicated for many printing device users and may require a technician, printing device administrator, or other specially trained person. Additionally, the amount of user interaction currently required, e.g., downloading a specific patch or upgrade, choosing a particular printing device configuration, etc., often requires a significant amount of time or procedural experience.

SUMMARY

A method of providing firmware for a printing device includes attaching a memory module storing a firmware upgrade to a printing device consumable.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DETAILED DESCRIPTION

This specification describes a method and device for installing firmware upgrades on a printer or printing device. The described method includes storing firmware components on a memory module attached to a printing device consumable and uploading that firmware to the printing device for storage in the memory of the printing device. As used herein, the term "firmware" includes computer-readable instructions for the processor or controller of a printing device and may be any embedded software in the printing device. Some relevant examples of firmware upgrades include, bug fixes, printer security fixes, customized color tables for the ink or toner cartridge used by a printing device, Internet capabilities, performance enhancements, providing additional functionality, etc.

Figure 1:
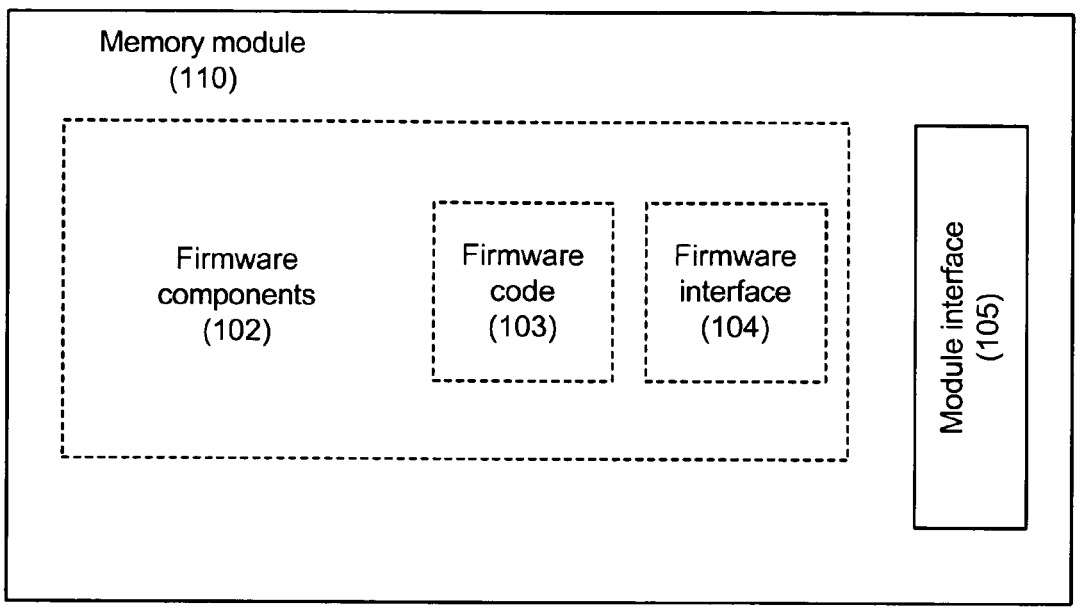
FIG. 1 is a block diagram illustrating firmware components stored on a memory module according to one embodiment of the present invention.

As shown in FIG. 1, firmware components (102) are stored on a memory module (110). The module (110) is a non-volatile memory device, for example, Flash memory, and includes a module interface (105) through which the data stored on the module (110), including the firmware components (102), can be accessed. The module interface (105) can be a wired or wireless interface. As will be described below, the module interface (105) interfaces the memory module (110) with a printing device so that the printing device can upload the firmware components (102), including, firmware code (103), firmware interface (104), and other data items on the memory module (110).

In general, firmware code (103) is a set of computer-readable instructions that enable the processor or controller of a printer or printing device to carry out a particular function. Therefore, the firmware code (103) may be written in a variety of different computer languages, e.g., Java, C++, COM, etc. The firmware code (103) on the memory module (110), when stored on a printing device, provides the printing device with the ability to perform the particular function(s) related to the computer-readable instructions of the firmware code (103). The firmware code (103) may be a single firmware object or may be any number of separate firmware objects for use by a printing device.

As indicated, the firmware code (103) can be used by a printing device to accomplish a wide variety of purposes such as fixing an existing firmware bug, upgrading existing firmware, or adding new functionality to the printing device. For example, a new technology may allow high resolution while using less toner than current printing techniques. In order to add this new technology to a printing device, computer-readable instructions included in the firmware code (103) can be written to allow the printing device and printing device components to implement the desired new technology.

In addition to the firmware code (103), a firmware interface (104) may be included with the firmware components (102) on the memory module (110). The firmware interface (104) can be uploaded to the memory of a printing device to allow the printing device to access and execute the firmware code (103) while the firmware code (103) remains stored on the memory module (110) and is not uploaded to the memory of the host printing device. The firmware interface (104) may also provide the host printing device with details about the different objects of firmware code (103) available on the module (110), such as the size, location, version number, purpose, etc. of each object of firmware code. This information can be used by the host printing device to determine whether or not to upload the objects of firmware code (103) from the memory module (110).

Figure 2:
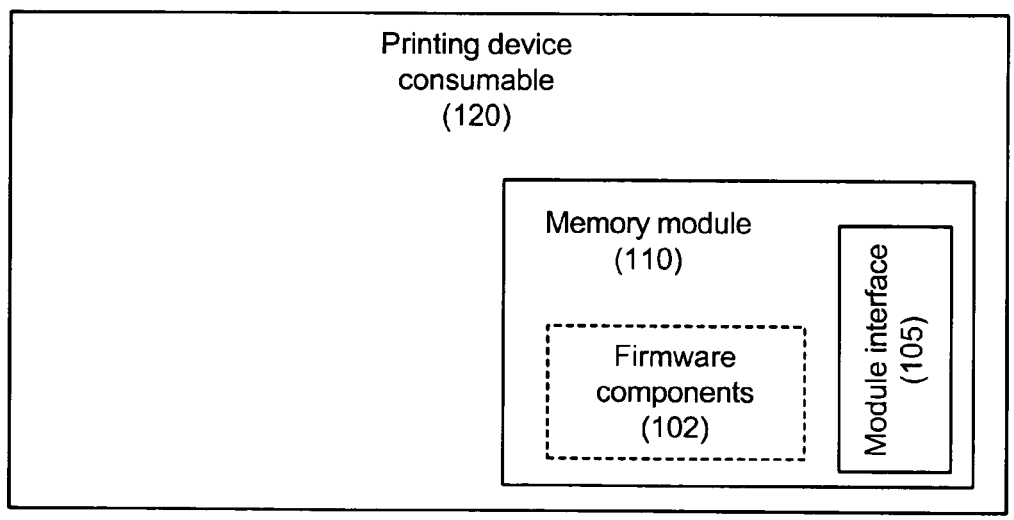
FIG. 2 is a block diagram illustrating a printing device consumable with an affixed memory module according to one embodiment of the present invention.

As shown in FIG. 2, the memory module (110) is attached to a printing device consumable (120) that will be provided to, or placed in, a printer or printing device. As indicated above, a "consumable" is any material, including toner or print media, consumed by a printing device to produce hardcopy documents. In addition to toner and print media, a "consumable" may be any part or portion of a printer or printing device that is periodically replaced to allow the printer or printing device to continue producing printed hardcopy documents. The memory module (110) may, for example, be attached to the disposable cartridge or container that holds the toner in the printer. The memory module (110) may also be attached to the stack or supply of print media or to some other consumable part of the printer, such as a replaceable imaging drum.

The module interface (105) then provides communication between the printing device and the memory module (110) so that the printer can upload or use the firmware components (102) and other data items on the memory module (110). The printer may upload the firmware components (102) and other data items on the memory module (110) to a memory unit in the printing device or, alternatively, the printing device may execute or use the firmware components (102) and other data items directly from the memory module (110).

As indicated, the module interface (105) may be a wired or wireless interface for transferring data between the memory module (110) and a printing device. For example, the module interface (105) may comprise input/output lines or pins for allowing wired transmission and reception of data between the memory module (110) and a host printing device. Alternatively, the module interface (105) may also include an infrared transceiver to send and receive data wirelessly with an infrared signal. In still another example, the module interface (105) may include an antenna coil to send and receive data wirelessly using, for example, a radio frequency (RF) signal. For example, a Radio Frequency Identification (RFID) method and protocol may be used to transmit data between a memory module (110) and a printing device. Using a wireless method, as described herein, is advantageous because no physical contact between the memory module (110) and printing device is required, i.e., the physical design of a printing device and corresponding consumables is facilitated.

Figure 3:
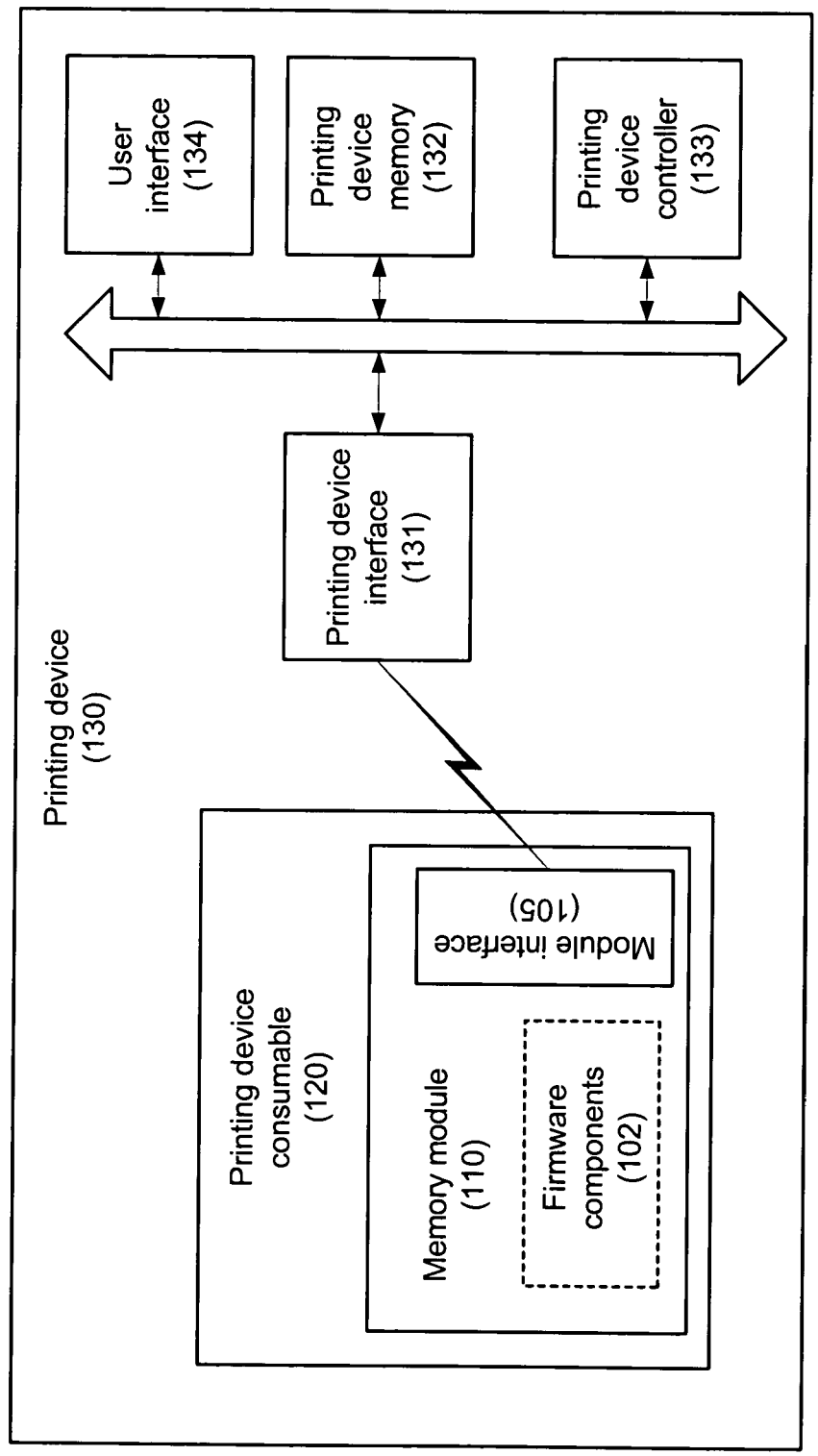
FIG. 3 is a block diagram of the consumable and memory module of FIG. 2 in use by a printing device according to one embodiment of the present invention.

FIG. 3 is a block diagram illustrating a consumable (120) that has been installed in, or supplied to, a printer or printing device (130). The consumable (120) bears a memory module (110) storing firmware components (102) for use by the printing device (130) as described above.

As shown in FIG. 3, the printing device (130) includes a printing device interface (131) that interfaces with the module interface (105) on the memory module (110). The printing device interface (131) will correspond to the module interface (105) to allow communication between the memory module (110) and the printing device (130). Consequently, the printing device interface (131) may be a receptacle for receiving the pins or wired traces of a wired module interface (105). Alternatively, the printing device interface (131) may be a wireless transceiver for communicating with a wireless transceiver of the module interface (105). In one embodiment, the memory module (110) may comprise an RFID memory tag as part of the module interface (105), and the printing device interface (131) may comprise an RFID interrogator. Alternatively, the module interface (105) and printing device interface (131) may, for example, be an infrared interface. The printing device interface (131) and the module interface (105) will be referred to collectively as the interface (105, 131).

The printing device (131) can upload the firmware components (102) and any other data items on the memory module (110) through the interface (105, 131). The firmware components (102) and any other uploaded data items may be stored in the memory unit (132) of the printing device (130). This printing device memory (132) may comprise both volatile and non-volatile memory, both writable and read-only memory. If the firmware components (102) are uploaded to the memory unit (132), the firmware components (102) may be stored in non-volatile memory so as to be available each time the printing device (130) is powered up.

Alternatively, the interface (105, 131) can allow the printing device (130) to execute or use the firmware components (102) and other data items directly from the memory module (110) without uploading or storing the firmware code (103, FIG. 1) in the printing device memory unit (132). This is done by uploading the firmware interface (104, FIG. 1) from the memory module (110) and using the firmware interface (104) to execute the firmware code (103, FIG. 1) from the memory module (110). In such an embodiment, the firmware interface (104, FIG. 1) may be uploaded to volatile or non-volatile memory in the printing device memory unit (132). If the firmware interface (104, FIG. 1) is kept only in volatile memory, the firmware interface (104, FIG. 1) will be uploaded each time the printing device (130) is powered up. However, this will reduce the demands on non-volatile memory.

A printing device controller or processor (133) controls the operation of the printing device (130) according to firmware stored in the printing device memory (132). As indicated, if the firmware components (102) are uploaded and stored in the memory unit (132), the controller (133) can then execute both existing firmware in the memory (132) and the new firmware code (103, FIG. 1) provided on a consumable (120) to perform the desired printing device function(s). In some instances, the new firmware code (103, FIG. 1) may replace or overwrite some or all of the firmware previously stored in the printing device memory (132).

The printing device (130) also includes a user interface (134) to allow a user or attendant to control operation of the printing device (130). Such a user interface (134) may include, for example, a display device such as a liquid crystal display (LCD) and a keypad, buttons or other device for allowing a user to input or select data, such as selecting menu items or responding to queries. Alternatively, the user interface (134) may include a touch screen that both displays data and receives user input.

In some embodiments, the printing device (130) may automatically upload, store or use programming (e.g., 103, FIG. 1) or other data from an interfaced memory module (110). Alternatively, the user interface (134) can allow the operator of the printing device (130) to control whether the printing device (130) uploads, stores or uses any of the firmware programming or data available from an interfaced memory module (110) on a consumable (120).

Once the firmware components (102) are available to the printing device (130), either stored in the printing device memory (132) or available directly from an interfaced memory module (110), the firmware components (102) can be used to perform, or upgrade the performance of, any function on a printing device that is performed by the controller (133) using the embedded computer-readable instructions of the firmware. For example, the firmware components (102) may allow a printing device to provide information about printing device conditions over the Internet or send email messages to designated recipients indicating printing device conditions. Such emails may be sent in response to trigger events, for example, an occurrence of low toner, lack of paper, a paper jam, etc.

Figure 4:
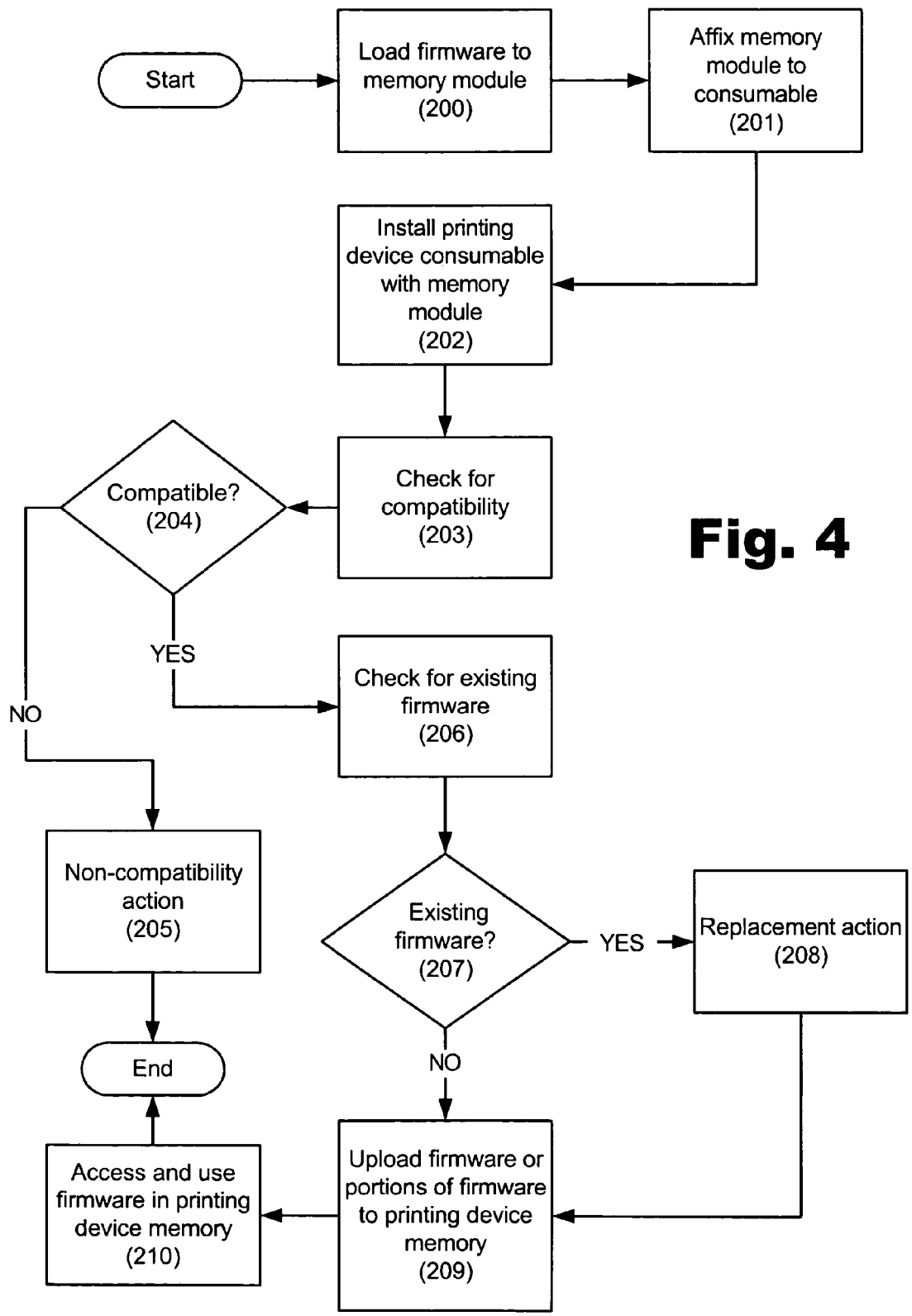
FIG. 4 is a flowchart illustrating a method of providing firmware for a printing device according to one embodiment of the present invention.

FIG. 4 is a flowchart illustrating a method of providing firmware for a printing device. As shown in FIG. 4, firmware components are loaded on a memory module (step 200). The memory module may be any memory device capable of storing computer-readable instructions, including, but not limited to, Flash memory, battery-backed random access memory (RAM), etc. The memory module is then attached or affixed to a consumable that will be used by or in a printing device (step 201).

After a printing device consumable, e.g., a toner cartridge, etc., with the attached memory module has been installed in a printing device (step 202), a check for hardware/software compatibility may be performed (step 203). If the firmware components are not compatible with the hardware/software of the host printing device (determination 204), a non-compatibility action is carried out (step 205). For example, a non-compatibility action may include a notice appearing on a computer monitor or a display device of a user interface on the printing device indicating that the firmware components (102, FIG. 1) available are incompatible with the printing device. Additionally, information on upgrades or other actions that may fix the compatibility problem may be displayed along with the indication of incompatibility.

If the firmware components (102, FIG. 1) are compatible with the printing device (determination 204), a check for an existing firmware components may be performed (step 206). Most printing devices already include firmware, i.e., various embedded software instructions to allow a variety of functions of the printing device. If other firmware components already exist on the printing device (determination 207), a replacement action may be performed (step 208). For example, a replacement action (step 208) may include determining whether the firmware already present in the printing device memory is an older version that the version of that firmware available on the memory module of the consumable. Based on the result of such a determination, or other factors, the replacement action (step 208) may include overwriting the existing or previous firmware components in the memory of the printing device with the new firmware components available from the memory module on the consumable (step 209).

Alternatively, a replacement action (step 208) may comprise uploading only certain segments or discrete objects of firmware (102, FIG. 1) from the memory module, thereby upgrading or enhancing the existing firmware of the printing device (step 209). This may, in some cases, simply render the previous firmware components in the printing device a functional replica of the firmware components provided on the memory module on the consumable.

User input through the user interface of the printing device may be requested before an existing firmware set is replaced, in whole or in part, by firmware components that are available through a memory module on a consumable. Additionally, a password or other confirmation of authority may be required to initiate replacement, in whole or in part, of an existing firmware in the printing device.

Thus, as part of the replacement action (step 208), or if the particular firmware components (102, FIG. 1) that are available on the memory module of the consumable do not presently exist on the printing device (determination 207), all or part of the firmware components (102, FIG. 1) may be uploaded to the printing device memory (step 209). After the new firmware components have been installed, the firmware may be accessed in printing device memory and used (step 210) as described above.

Figure 5:
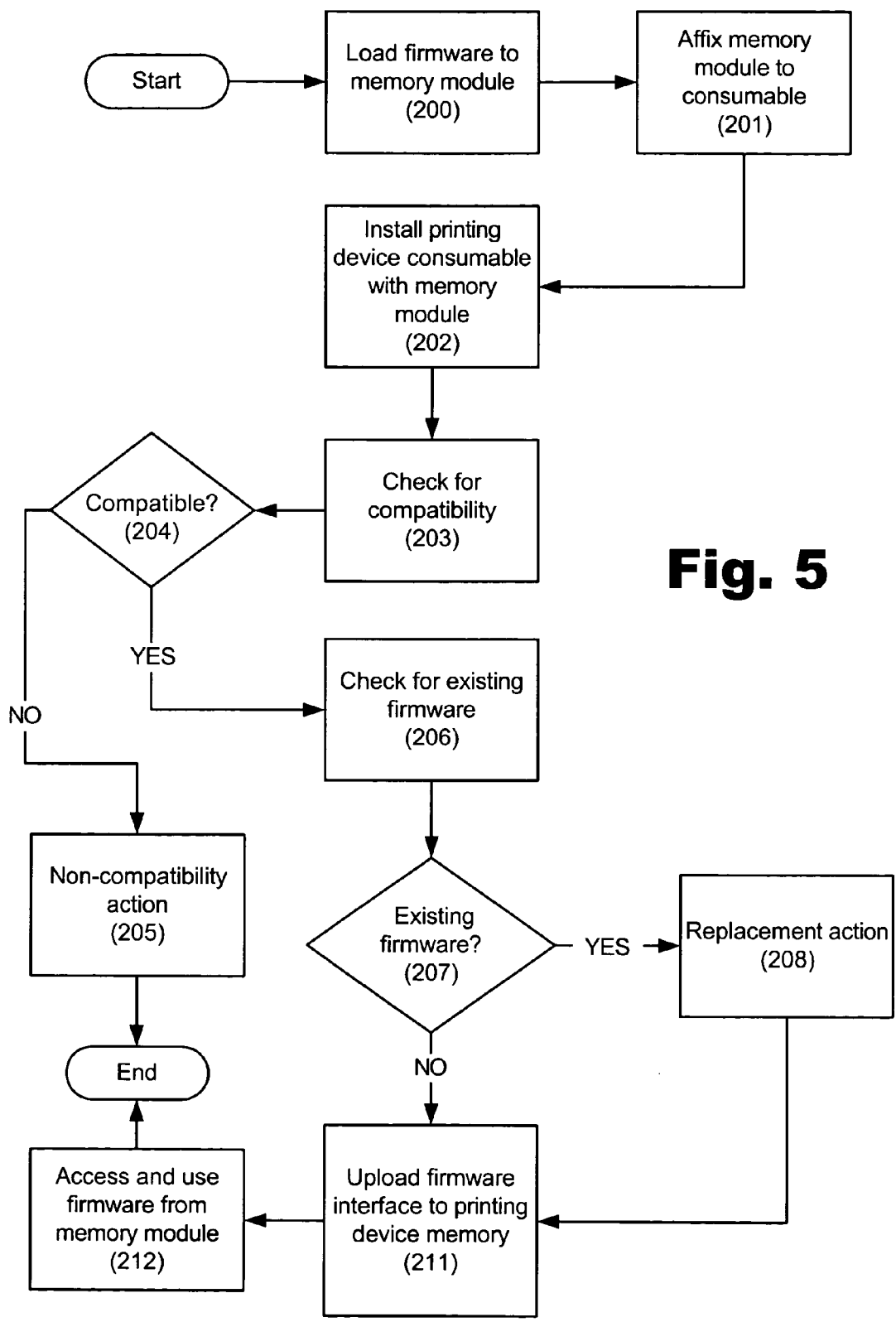
FIG. 5 is a flowchart illustrating a method of providing firmware for a printing device according to an alternative embodiment of the present invention.

FIG. 5 is a flowchart illustrating another method of providing firmware for a printing device. FIG. 5 is similar to FIG. 4. As shown in FIG. 5, firmware is loaded on a memory module (step 200). The memory module may be any memory device capable of storing computer-readable instructions. The memory module is then attached or affixed to a consumable that will be used by or in a printing device (step 201).

After a printing device consumable with the attached memory module has been installed in a printing device (step 202), a check for hardware/software compatibility may be performed (step 203). If the firmware on the memory module is not compatible with the hardware/software of the host printing device (determination 204), a non-compatibility action is carried out (step 205). For example, a non-compatibility action may comprise a notice indicating that the firmware available is incompatible with the printing device. Additionally, information that may be used to fix the compatibility problem may be displayed along with the indication of incompatibility.

If the firmware is compatible with the printing device (determination 204), a check for existing firmware may be performed as described above (step 206). If comparable firmware already exists on the printing device (determination 207), a replacement action may be performed (step 208). As above, the replacement action (step 208) may include comparing the version of the existing and newly available firmware objects and disabling or erasing the existing or previous firmware in the memory of the printing device in favor of the new firmware available from the memory module on the consumable. User input through the user interface of the printing device may be requested before an existing firmware set is replaced in favor of firmware that is available through a memory module on a consumable. Additionally, a password or other confirmation of authority may be required to initiate replacement of existing firmware in the printing device.

As part of the replacement action (step 208), or if no comparable firmware object presently exists on a printing device (determination 207), a firmware interface (104, FIG. 1) is uploaded to the printing device memory (step 211). The interface (104) may be stored in non-volatile memory so as to be available every time the printing device is started. Alternatively, the interface (104) may be stored in volatile memory and uploaded each time the printing device is started with an installed consumable bearing a memory module with the firmware interface (104) stored thereon.

As described above in connection with FIG. 1, the firmware interface is a set of computer-readable instructions that allow the printing device controller to communicate with and execute the firmware code (103, FIG. 1) while the firmware code remains on the memory module on the consumable and is not loaded or installed in the memory unit of the printing device. After the firmware interface has been stored on the printing device, the firmware interface can be used to access and execute the firmware code on the memory module (step 212), without having to copy the firmware code into the memory of the printing device.

The process of FIG. 5 differs from the process of FIG. 4 in that the process of FIG. 4 stores the firmware code in printing device memory, while the process of FIG. 5 does not. Instead, the process of FIG. 5 accesses and uses part or all of the firmware code on the memory module (step 212) whenever the firmware code is needed.

Figure 6:
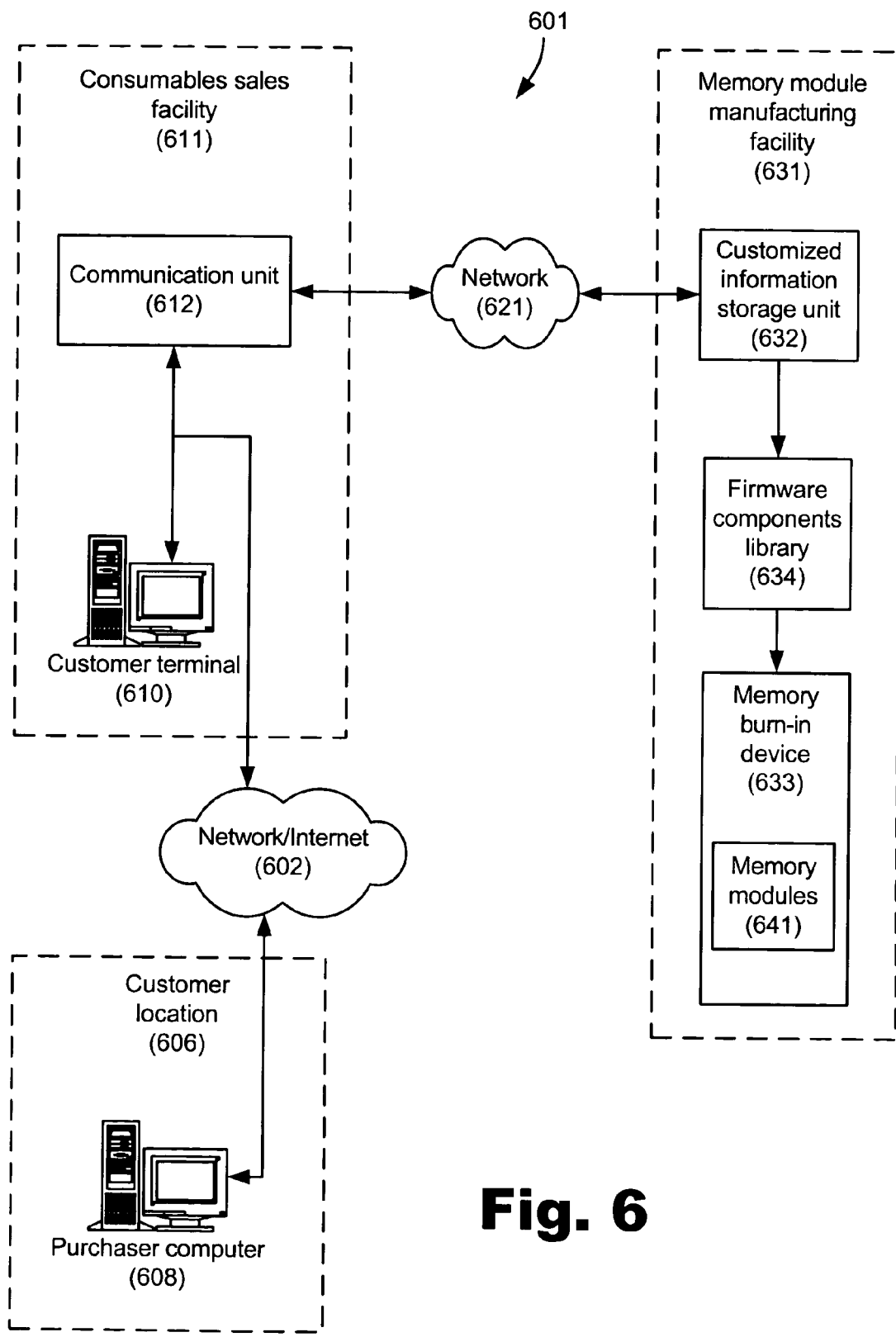
FIG. 6 is a block diagram illustrating a system for customizing firmware on memory modules according to one embodiment of the present invention.

FIG. 6 is a block diagram illustrating a system for customizing firmware components on memory modules. In particular, FIG. 6 illustrates a system with which a consumable purchaser can choose the firmware components that are provided on a memory module (110, FIG. 2) that is affixed to the consumable (120, FIG. 2) being purchased.

As shown in FIG. 6, the system (601) may include components at up to three different locations: a customer location (606), a consumables sales facility (611), and a memory module manufacturing facility (631). There are a number of possible scenarios for a purchaser who wishes to buy printing device consumables with customized memory modules bearing firmware components.

For example, a purchaser may visit a sales facility (611). The sales facility (611) may include a customer terminal (610) into which a purchaser can enter the information to customize a memory module on purchased consumables. For example, the purchaser, using the customer terminal (610) can select exactly the firmware components (102, FIG. 1) that are desired. For example, the version of firmware, firmware patches, firmware upgrades, etc. can all be selected by the purchaser at the terminal (610). Alternatively, the purchaser could telephone, fax, email or otherwise transmit the information to the sales facility (611), whereupon sales facility personnel would enter the information into the terminal (610).

The firmware component selections are then sent to a communication unit (612). The communication unit (612) transfers the selections for customizing the memory module to a memory module manufacturing facility (631). The communication unit (612) may communication with the manufacturing facility (631) through a network (621). The network (621) may be a private or public network, and may include the Internet. The sales facility (611) and the manufacturing facility (631) may be at the same location or may be in different cities or even on different continents.

The firmware selections for customizing the memory module are stored in a data storage unit (632) until it is time to prepare the customized memory module. The firmware selections are then fed to a firmware components library (634) where the selected firmware components are identified and retrieved. The selected firmware components are then read into the system that forms the customized memory module, for example, a memory burn-in device (633). The burn-in device (633) then creates the customized memory module (641) desired by the purchaser by loading the desired firmware components from the library (634) onto the memory module (641). The customized memory module (641) is then affixed to the ordered consumable and shipped to the purchaser.

In a different scenario, the purchaser need not visit the sales facility (611) to place an order for a customized memory module. Rather, the purchaser can use a computer (608) at the customer's location (606). For example, the purchaser, using the computer (608) can contact the communication unit (612) electronically. In one embodiment, the communication unit (612) includes a web server that the purchaser accesses through the Internet (602). The purchaser then inputs the information for customizing the memory module, i.e., selections of desired firmware components. These selections are then transmitted to the communication unit (612), which may treat the selections in the same manner as if entered through the customer terminal (610) at the sales facility (611). The selected firmware components are then loaded to a customized memory module (641) as described above.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

The invention claimed is:

1. A method of providing firmware for a printing device, said method comprising attaching a memory module storing said firmware to a printing device consumable, wherein said memory module contains said firmware and a firmware interface object.

2. The method of claim 1, further comprising:
installing said printing device consumable in said printing device; and
interfacing said printing device and said memory module.

3. The method of claim 2, further comprising uploading said firmware from said memory module to a memory of said printing device.

4. The method of claim 3, further comprising executing said firmware with a controller of said printing device.

5. The method of claim 2, further comprising uploading said firmware interface to a memory of said printing device.

6. The method of claim 5, further comprising executing said firmware on said memory module through said firmware interface without uploading said firmware to non-volatile memory of said printing device.

7. A method for executing firmware components from a printing device, said method comprising:
storing said firmware components on a memory module;
attaching said memory module to a printing device consumable;
installing said printing device consumable with attached memory module in a printing device; and
uploading part or all of said firmware components to a printing device memory;
wherein said uploading part or all of said firmware components to printing device memory comprises:
determining if previous interfering firmware components already exist in said printing device memory; and
uploading said firmware components to printing device memory if no previous interfering firmware components are found.

8. The method of claim 7, wherein said printing device consumable comprises a toner cartridge.

9. The method of claim 7, wherein said uploading part or all of said firmware components to printing device memory comprises evaluating compatibility of said firmware components with said printing device.

10. A method for executing firmware components from a printing device, said method comprising:
storing said firmware components on a memory module;
attaching said memory module to a printing device consumable;
installing said printing device consumable with attached memory module in a printing device; and
uploading part or all of said firmware components to a printing device memory;
wherein said uploading part or all of said firmware components to printing device memory comprises:
determining if previous interfering firmware components already exist in said printing device memory; and
performing a replacement action if previous interfering firmware components are found.

11. The method of claim 10, wherein said performing a replacement action requires an administration setting, password, or other form of authentication.

12. The method of claim 10, wherein said performing a replacement action comprises comparing a version of firmware in said printing device memory with a version of firmware in said memory module.

13. The method of claim 10, wherein said printing device consumable comprises a toner cartridge.

14. A method for executing firmware code for a printing device using a printing device consumable, said method comprising:
storing firmware code on a memory module;
attaching said memory module to a printing device consumable;
installing said printing device consumable with attached memory module in a printing device; and
uploading a firmware interface for said firmware code to a printing device memory.

15. The method of claim 14, wherein said printing device consumable comprises a toner cartridge.

16. The method of claim 14, further comprising accessing said firmware code on said memory module trough said firmware interface.

17. A consumable for use with a printing device, said consumable comprising:
a printing device consumable;
a memory module attached to said printing device consumable; and
firmware components stored on said memory module;
wherein said firmware components comprises firmware code and a firmware interface for allowing access and use of said firmware code on said memory module.

18. The consumable of claim 17, further comprising a wireless interface for said memory module for interfacing and communicating with a printing device.

19. The consumable of claim 18, wherein said wireless interface comprises a radio frequency interface.

20. The consumable of claim 18, wherein said wireless interface comprises an infrared interface.

21. The consumable of claim 17, further comprising a wired interface for said memory module for interfacing and communicating with a printing device.

22. A printing device that allows access and use of firmware components stored on a memory module attached to a printing device consumable comprising:
a printing device controller;
a printing device memory; and
a printing device interface disposed and configured to interface and communicate with said memory module attached to a printing device consumable supplied to said printing device;
wherein said printing device controller is configured to upload a firmware interface object from said memory module and use said firmware interface to access additional firmware on said memory module.

23. The printing device of claim 22, wherein said printing device interface comprises a wireless interface.

24. The printing device of claim 23, wherein said wireless interface comprises a radio frequency interface.

25. The printing device of claim 23, wherein said wireless interface comprises an infrared interface.

26. The printing device of claim 22, wherein said printing device interface comprises a wired interface.

27. The printing device of claim 22, further comprising a user interface for controlling said printing device.

28. A printing device that allows access and use of firmware components stored on a memory module attached to a printing device consumable comprising:
  a printing device controller;
  a printing device memory; and
  a printing device interface disposed and configured to interface and communicate with said memory module attached to a printing device consumable supplied to said printing device;
  wherein said controller is configured to
    determine if previous interfering firmware components already exist in said printing device memory; and
    upload said firmware components to printing device memory if no previous interfering firmware components are found.

29. The device of claim 28, wherein said controller is further configured to evaluate compatibility of said firmware components with said printing device.

30. A printing device that allows access and use of firmware components stored on a memory module attached to a printing device consumable comprising:
  a printing device controller;
  a printing device memory; and
  a printing device interface disposed and configured to interface and communicate with said memory module attached to a printing device consumable supplied to said printing device;
  wherein said controller is configured to
    determine if previous interfering firmware components already exist in said printing device memory; and
    perform a replacement action if previous interfering firmware components are found.

31. The device of claim 30, wherein said replacement action requires an administration setting, password, or other form of authentication.

32. The device of claim 30, wherein said replacement action comprises comparing a version of firmware in said printing device memory with a version of firmware in said memory module.

33. The device of claim 30, wherein said controller is further configured to evaluate compatibility of said firmware components with said printing device.

* * * * *

UNITED STATES PATENT AND TRADEMARK OFFICE
CERTIFICATE OF CORRECTION

| | |
|---|---|
| PATENT NO. | : 7,043,166 B2 |
| APPLICATION NO. | : 10/615033 |
| DATED | : May 9, 2006 |
| INVENTOR(S) | : Travis J. Parry et al. |

Page 1 of 1

It is certified that error appears in the above-identified patent and that said Letters Patent is hereby corrected as shown below:

In column 2, line 13, delete "modem" and insert -- modern --, therefor.

In column 10, line 28, in Claim 16, delete "trough" and insert -- through --, therefor.

Signed and Sealed this

Eleventh Day of August, 2009

David J. Kappos
*Director of the United States Patent and Trademark Office*